UNITED STATES PATENT OFFICE.

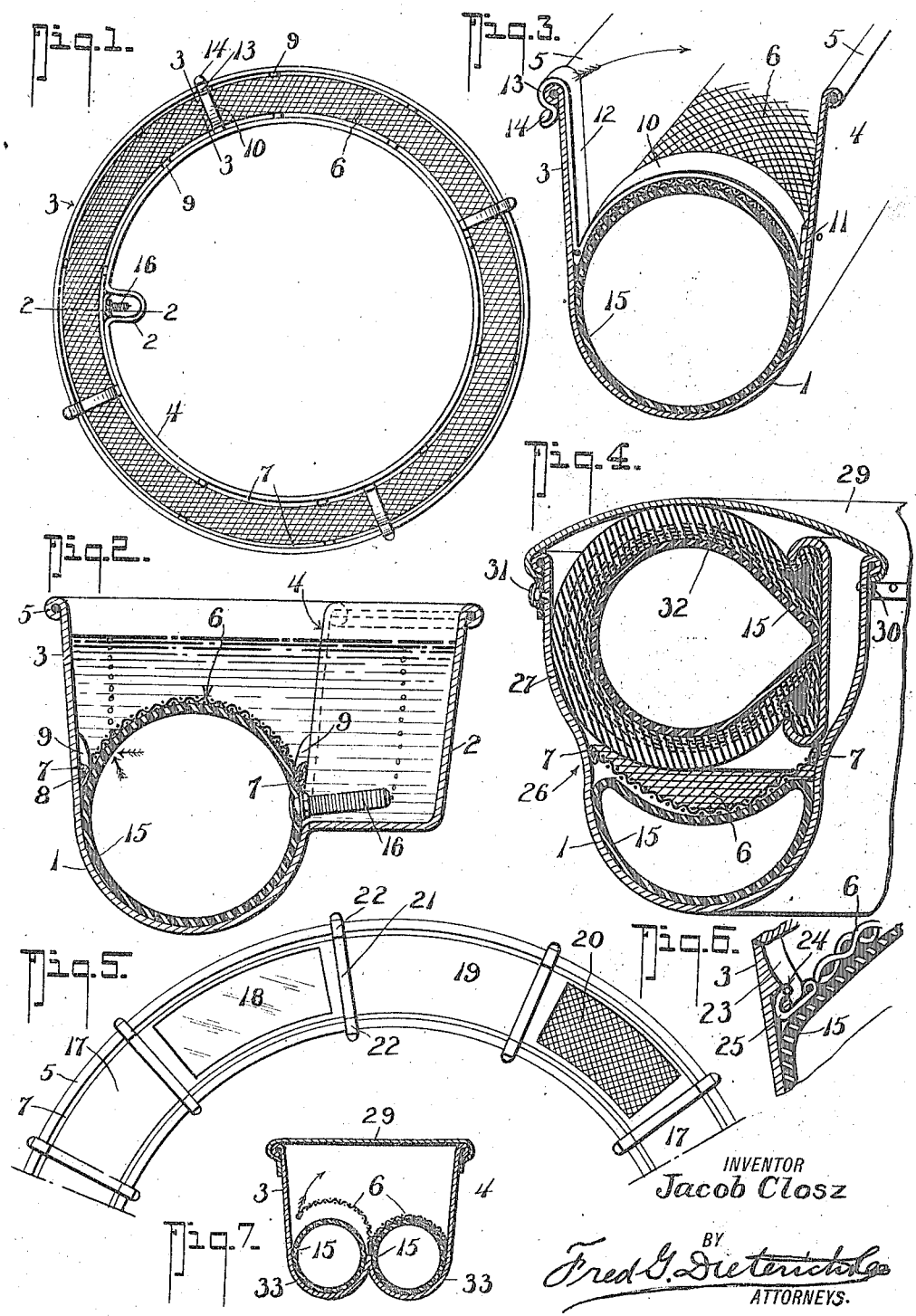

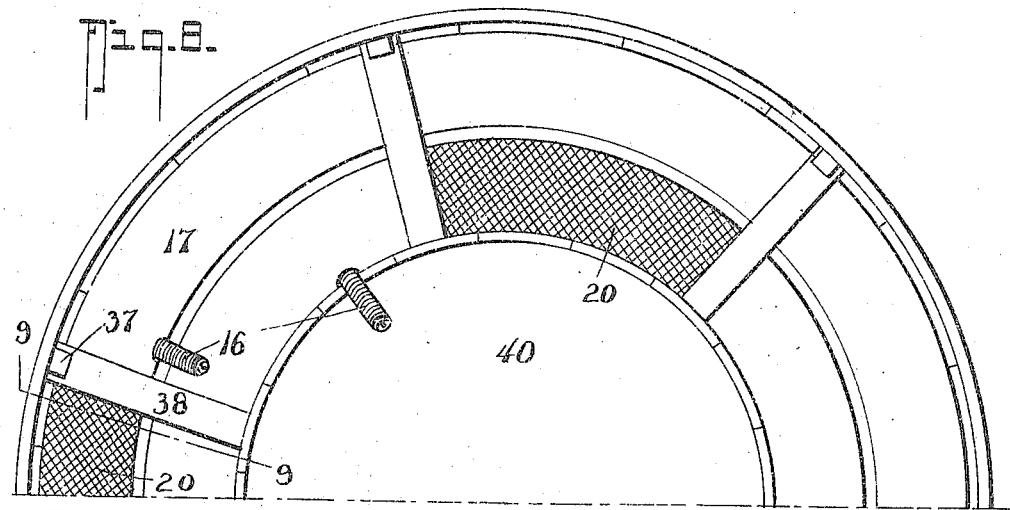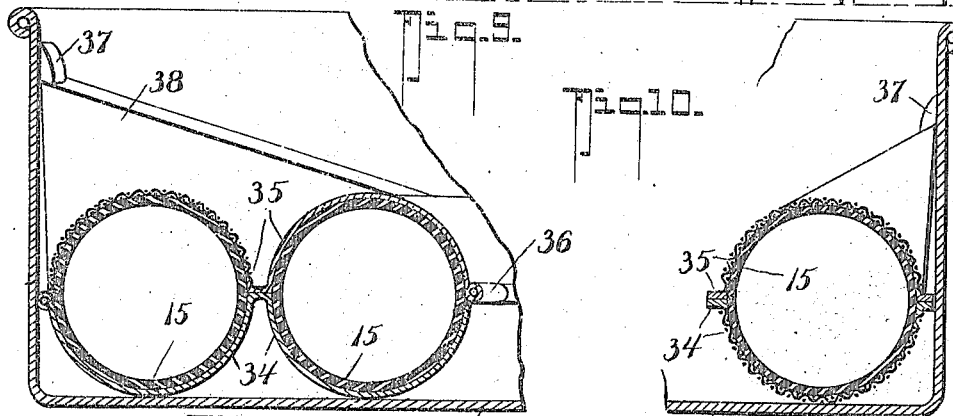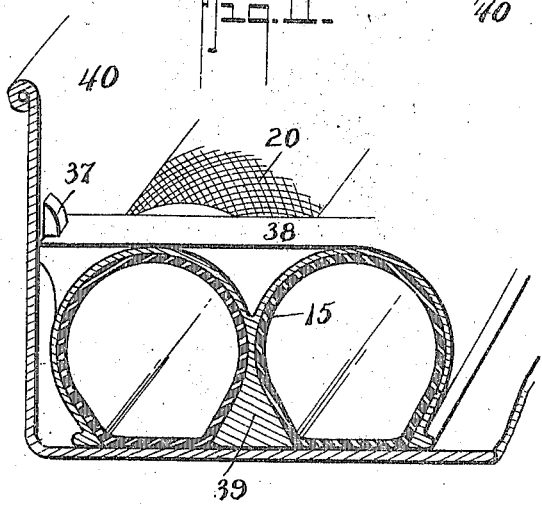

JACOB CLOSZ, OF ST. ANSGAR, IOWA.

PNEUMATIC TUBE-TESTING AND TIRE-CARRYING DEVICE.

1,148,287.

Specification of Letters Patent.

Patented July 27, 1915.

Application filed March 20, 1915. Serial No. 15,353.

*To all whom it may concern:*

Be it known that I, JACOB CLOSZ, residing at St. Ansgar, in the county of Mitchell and State of Iowa, have invented certain new and useful Improvements in Pneumatic Tube-Testing and Tire-Carrying Devices, of which the following is a specification.

My invention primarily has for its object to provide a simple, inexpensive, light and serviceable device, by means of which leaks in the inner tubes of pneumatic tires may be quickly and conveniently detected.

Another object of my invention is to provide a device of the foregoing character that may serve the two-fold function of a testing device and a tire carrying case, the same being portable and adapted to be readily carried on the tire holder of an automobile.

Generically, the invention comprises a trough or receptacle made of any suitable material to hold water or its equivalent, the receptacle being preferably circular, open-topped, and having, preferably, a half round bottom, to receive the inner tube, the receptacle also having provision to receive the tube valve.

The invention further includes the provision of a suitable tube conforming and confining body designed to restrain the tube in the bottom of the receptacle and prevent bursting while the tube is inflated to detect punctures, and particularly slow leaks which only become noticeable and operative under air pressure too great for a non-confined inner tube to stand, by escaping air bubbles through the immersing liquid.

Subordinately, the invention includes those novel features of construction, combination and arrangement of parts, all of which will be first fully described and then be specifically pointed out in the appended claims and illustrated in the accompanying drawings, in which:—

Figure 1 is a top plan view of one form of the invention. Fig. 2 is an enlarged cross-section on the line 2—2 of Fig. 1. Fig. 3 is an enlarged cross sectional perspective on the line 3—3 of Fig. 1. Fig. 4 is a cross section of a modified form of the invention showing how the same may be adapted as a tire and tube carrying case when not filled with water for testing purposes. Fig. 5 is a top plan view of a portion of a modification showing how the confining and restraining member may be composed of various material. Fig. 6 is a detail perspective view illustrating a modified way of securing the restraining member in place. Fig. 7 is a detail cross section of a modification designed for the reception of tubes of different wheel diameters. Fig. 8 is a top plan view of a further modification. Fig. 9 is a cross section on the line 9—9 of Fig. 8. Fig. 10 is a cross section showing a modification of the form shown in Fig. 9. Fig. 11 is a cross section showing a further modification of the construction shown in Fig. 8. Fig. 12 is a cross section similar to Fig. 10, showing the same modification designed for a single tube receptacle.

Referring now to the accompanying drawings, in which like numerals of reference designate corresponding parts in all of the figures, 1 designates the bottom of the receptacle which, in the preferred form, is of substantial semi-circular shape in cross section, the receptacle being of a trough-like form and provided with an outer annular upwardly extending wall 3, and an inner annular outwardly extending wall 4 being formed to provide a valve receiving recess 2, as best shown in Figs. 1 and 2 of the drawings.

The upper edges of the receptacle may be curled over to provide reinforcements, as at 5, if desired. The receptacle referred to may be made of any suitable material and in different sizes as may be found desirable.

In order to confine the tube within the bottom of the receptacle and prevent its expansion beyond predetermined limits, I provide what I term, for convenience of description, "a tube confining and restraining body" 6 which is in the nature of a cover for that portion of the tube that does not come in contact with the receptacle body. The tube restraining and confining member 6 in the form shown in Figs. 1 to 4, inclusive of the drawings, is composed of a mesh body provided with edge beads 7 suitably reinforced at 8 and in order to hold the body 6 in place various devices may be provided as found convenient. In Fig. 2, I have shown under cut lugs 9 beneath which the reinforcing rims 7 may be hooked. Either in addition to the lugs 9, or in lieu thereof, I may provide flexible strip members 10 that may be hinged in any approved way as by an ordinary hinge joint at 11 to the inner wall 4 of the receptacle and detachably secured to the outer wall 3 by upright strips 12 that have spring hooks 13. These hooks 13 may be sprung over the outer bead 5 and in order to enable their convenient detachment they may be provided with finger engagements 14 (see Fig. 3).

15 designates the inner tube which is, of course, of the usual construction, and 16 designates the valve stem.

The restraining and confining member 6, as before stated, may be made of any suitable material as, for instance, open mesh fabric or wire, a solid body 17 opaque throughout the greater part of its area and provided with a transparent opening, through which the tube may be viewed, as at 18, (see Fig. 5) or it may be made of canvas, duck, etc., as at 19 and provided with either a transparent solid body 18 of mica, glass, or other suitable material, or with a mesh section 20, through which the tube can be viewed. It should be understood that when the restraining and confining member is made of an opaque body with a transparent body 18 or mesh window 20, the same should be made susceptible of shifting rotatably throughout the central axis of the receptacle, so as to expose different parts of the inflated tube in order to locate the leak.

When the restraining member 6 is to be made wholly removable or made susceptible of shifting, the fastening devices may be composed of bows 21 held by spring clip arms 22 of a construction similar to the arms 12—13—14, shown in Fig. 3 of the drawings.

In lieu of the fastening means shown in Figs. 1, 3 and 5, I may provide the restraining member with hooks 25 along its longitudinal edges to hook into openings 24 of lugs 23 on the walls of the receptacle, as shown in the detail Fig. 6.

In Fig. 7 I have shown a further modification in which the trough or receptacle is designed to receive a plurality of tubes of different wheel diameters and in this form, the bottom 33 is formed of two semi-cylindrical tube receiving portions.

A cover 29 may be provided to close the open side of the receptacle and this is particularly advantageous when the receptatcle is to be used also as a spare tire case (see Fig. 4). By reference to Fig. 4, it will be noticed that the cover 29 may be riveted or otherwise secured to the inner wall of the receptacle as at 30 and fasten to the outer wall by snap fasteners 31 or in any other suitable way. In the form shown in Fig. 4, the bottom 1 merges at 26 with an enlarged or extended portion 27 that is adapted to form the receiving pocket for the spare tire 32.

In Fig. 8, I have shown a further modification in which the receptacle is in the nature of a pan in which removable restraining and immersing bodies 34—35 may be located, the removable bodies 34—35 consisting of two half sections preferably provided with interprojecting beads 36 to afford a complete closure and prevent the tube from pinching, the restraining bodies 34—35 being held in place, to maintain the tube or tubes immersed, by suitable lugs 37 on the walls of the receptatcle that are adapted to be engaged by locking projections 38 which are carried by the upper section 35 of the restraining member, it being understood, of course, that the restraining member in this form may be constructed of any desired materials, as in the other forms, and may be adapted to receive a tire of a single wheel diameter size, as indicated in Fig. 10, or may be made to receive a plurality of tubes at the same time, as shown in Figs. 8 and 9.

In the form shown in Fig. 11, the confining and restraining member may consist of a channeled body 39 (either single or double) having an opening along one side and adapted to be snugly held againt the bottom of the receptacle 40 by the lugs 37 as indicated in Fig. 11 of the drawings.

It should be understood that the restraining member 6 when made of mesh material may be composed of a semi-rigid, rigid or flexible mesh body, depending upon the materials used, it being understood, however, that the materials employed should be of sufficient strength to serve the desired purpose, and when a transparency 18 is used, the same may be composed of glass, mica, etc. It will also be observed by the use of my invention, slow leaks and punctures in pneumatic tires can be readily determined and as the device is constructed, the tube may be reversed in the receptacle as often as desired, in order to expose the entire surface of the same to view in the water to enable the detection of leaks by the air bubbles formed.

While I have shown several modifications of the invention, I do not wish it understood that I limit myself thereto, as other modifications in the details of construction and design of the parts will readily occur to those skilled in the art.

What I claim is:

1. In a device of the character stated, a receptacle adapted to receive a liquid and adapted to receive a tire tube when inflated, and a body coöperative with the receptacle for confining the tube against bursting, said body adapted to permit the escape of air to create bubbles in the liquid and thereby locate punctures and leaks.

2. In a device of the character stated, a receptacle adapted to receive a liquid and adapted to receive an inner tire tube when inflated, a body coöperative with the receptacle for holding the tube immersed in the liquid and restraining said tube from bursting, said body including at least a section to expose the tube whereby the location of the point of escape of the air bubbles may be determined.

3. In a device of the character stated, a receptacle adapted to receive a liquid, and adapted to receive a tire tube, and a member adapted to coöperate with a part of the receptacle to confine the tube and hold it from bursting while inflated and immersed in the liquid, said member including at least a portion to expose the tube whereby the point of location of the escaping air may be determined.

4. In a device of the character described, a trough adapted to receive the inner tube of a tire, said trough having a recess to receive the projecting tire valve, said trough being adapted to contain a liquid to immerse said tube, combined with a body coöperative with the trough for restraining said tube and holding it against bursting when inflated.

5. In a device of the character stated, a trough adapted to receive the inner tube of a tire, said trough having a recess to receive the projecting tire valve, said trough being adapted to contain a liquid to immerse said tube, combined with a body coöperative with the trough for restraining said tube and holding it against bursting when inflated, and devices for holding said body in place.

6. In a device of the character described, a trough adapted to receive the inner tube of a tire, said trough having a recess to receive the projecting tire valve, said trough being adapted to contain a liquid to immerse said tube, combined with a body coöperative with the trough for restraining said tube and holding it against bursting when inflated, devices for holding said body in place, said body having at least a section through which the tube may be viewed for the detection of escaping air to locate punctures.

7. In a device of the character stated, an annular trough-like receptacle having a bottom to receive the inner tube of a tire, said receptacle including an extension part to receive and serve as a holder for the outer case of a tire.

8. In a device of the character stated, an annular trough-like receptacle having a bottom to receive the inner tube of a tire, said receptacle including an extension part to receive and serve as a holder for the outer case of a tire, and a tube restraining body within said receptacle.

9. In a device of the character stated, an annular trough-like receptacle having a bottom to receive the inner tube of a tire, said receptacle including an extension part to receive and serve as a holder for the outer case of a tire, a cover over said trough, and a tube restraining body within the trough.

JACOB CLOSZ.

Witness:
ALBERT E. DIETERICH.